United States Patent
Bessios (10) Patent No.: US 6,862,413 B2
(45) Date of Patent: Mar. 1, 2005

(54) COMPENSATION FOR POLARIZATION MODE DISPERSION IN SINGLE MODE FIBER

(75) Inventor: Anthony Bessios, Fremont, CA (US)

(73) Assignee: Agere Systems Inc., Allentown, PA (US)

( * ) Notice: Subject to any disclaimer, the term of this patent is extended or adjusted under 35 U.S.C. 154(b) by 640 days.

(21) Appl. No.: 10/036,750

(22) Filed: Dec. 21, 2001

(65) Prior Publication Data

US 2002/0186916 A1 Dec. 12, 2002

Related U.S. Application Data

(60) Provisional application No. 60/280,326, filed on Mar. 30, 2001.

(51) Int. Cl.[7] .............................................. H04B 10/06
(52) U.S. Cl. ....................... 398/208; 398/205; 398/147; 398/159; 375/317
(58) Field of Search ................................ 398/208, 209, 398/147, 159, 211, 210, 205; 375/317

(56) References Cited

U.S. PATENT DOCUMENTS

| | | | | |
|---|---|---|---|---|
| 5,191,462 A | * | 3/1993 | Gitlin et al. ................. | 398/209 |
| 6,751,255 B1 | * | 6/2004 | Reuven et al. ............... | 375/233 |
| 6,798,832 B1 | * | 9/2004 | Nakata et al. ............... | 375/233 |

* cited by examiner

*Primary Examiner*—M. R. Sedighian
*Assistant Examiner*—Christina Y Leung (57) ABSTRACT

A receiver employs non-linear threshold compensation to adjust input sample values from a single mode fiber to mitigate effects of polarization mode dispersion. A difference S between values for i) a decision for the current input sample and ii) a decision for the previous input sample is generated that indicates whether a transition between logic values occurred in the input data and the direction of transition (sign/phase). Two values are generated to determine a magnitude c of correction combined with the sign/phase (difference S) to generate a correction value. An error value e is generated as the magnitude of the difference between i) the decision for the input sample and ii) the input sample. A value d is calculated as the magnitude of the difference between i) the current input sample and ii) the previous input sample is also generated. The value d represents a relative "closeness" in value between two consecutive input samples. A magnitude c of correction combined with S is dependent upon the current states of S, e, and d and is based on detection of the presence or absence of a data transition, closeness in value between two consecutive input samples, and the error between the current sample and the decision for the current sample. The correction value is then combined with the current sample $y_k$ to generate a compensated sample. A hard decision is then generated for the compensated sample. Observation of transmitted data patterns for bit combinations through a single mode fiber at the transmission rate, e.g., 10 Gbps, allows for generation of a table of rules to determine the threshold levels L of each decision device. As decisions are generated for data, threshold value L may then be modified given the decisions for previous samples.

17 Claims, 14 Drawing Sheets

COMPENSATION FOR POLARIZATION MODE DISPERSION IN SINGLE MODE FIBER

CROSS-REFERENCE TO RELATED APPLICATIONS

This application claims the benefit of the filing date of U.S. provisional application No. 60/280,326, filed on Mar. 30, 2001.

BACKGROUND OF THE INVENTION

1. Field of the Invention

The present invention relates to detection of data in a communications system, and, more particularly, to compensation for signal dispersion in an optical fiber.

2. Description of the Related Art

In many digital communications systems, a user generates digital information that is then converted into an encoded (e.g., error-correction encoded) and/or packetized stream of data. The stream of data is then divided into discrete blocks. Each of the blocks may be mapped onto a corresponding one of a sequence of code or symbol values ("symbols") chosen from a predefined alphabet A, and generated with a period $T_S$, sometimes referred to as the "baud" rate. For optical transmission of the digital information, an optical carrier operating with a wavelength of, for example, 1310 nm or 1550 nm, is modulated with the encoded strewn of data. The modulated optical carrier is then passed through an optical fiber, such as a single mode fiber (SMF) having its lowest order bound propagating at 1310 nm or 1550 nm.

The modulated optical signal transmitted through the optical fiber comprises a series of light pulses. Since a transmission medium may be modeled as a filter having a corresponding (frequency-domain) transfer function and (time-domain) impulse response, the pulse transmitted through the optical fiber may be modified based on this transfer function. The pulse shape may be modified in amplitude and phase, and also experience dispersion of the pulse. Consequently, the time duration of the pulse transmitted through a medium may extend over a period of time greater than the time duration of a particular symbol. Adjacent pulses transmitted through the medium may thus corrupt each other, which corruption is known as inter-symbol interference (ISI). As bit rates in optical communication systems increase for high speed data transmission, such as rates above 10 Gbps, receivers are increasingly faced with mitigating effects of pulse dispersion and inter-symbol interference (ISI). A receiver typically includes a detector forming decisions for received, sampled channel output data ("receive signal") corresponding to the transmitted pulses. These detectors may apply compensation/equalization to the input samples of the received signal, and employ algorithms such as maximum-likelihood sequence detection to reconstruct the sequence of pulses in the transmitted, encoded stream of data.

For optical communication systems, there are several sources of pulse dispersion through an SMF. A first source of dispersion is chromatic dispersion that causes time-domain pulse broadening due to the different traveling velocities of each optical pulse's spectral components. Prior art methods of compensation for chromatic dispersion use an opposite dispersion-compensating fiber (DCF) that has a greater dispersion parameter, usually by a factor of 10.

A second source of dispersion is polarization mode dispersion (PMD) that arises from imperfections in the circular symmetry of the fiber core. Imperfections typically are from manufacturing flaws, chemical impurities, and/or excessive bending/strain during installation. Imperfect circular symmetry results in bi-refringent SMP that causes two orthogonal principal polarization states (PPS) to propagate with different velocities through the fiber core. The average differential group delay (DGD) is proportional to the square-root of the transmission distance. For example, an SMF having PMD of 10 ps $\sqrt{L}$, where L is the distance in kilometers, has a DGD of 100 ps (100 pico-seconds) at a distance of 100 km. At distances greater than 100 km and bit rates greater than 10 Gbps, the effects of DGD become significant when compared to the symbol period ($T_S$=100 ps at 10 Gbps for non-return-to-zero (NRZ) line coding). For a 10 Gbps transmission data rate, the magnitude of the maximum value for the mean DGD $<\tau_d>$ between two orthogonal PPSs has an upperbound of 100 ps (i.e., $<\tau_d> \leq 100$ ps).

The (SMF) channel may be modeled as a two-symbol dispersive channel with impulse response h(t), and the model for a 10 Gbps channel that reflects statistical differential delay between the two PPS components may be as given in equation (1):

$$h(t) = \sqrt{a}(\delta(t-\tau_d)) + \sqrt{1-a}(\delta(t)) \tag{1}$$

with $\delta(\cdot)$ defined as the delta function, with $(\alpha/(1-\alpha))$ defined as the power distribution ratio among the two orthogonal PPSs, and with $\tau_d$ following a Maxwell distribution as given in equation (2):

$$P_{\langle \tau_d \rangle}(\tau_d) = \frac{32\tau_d^2}{\pi^2 \langle \tau_d \rangle^3} \exp\left(-\frac{4\tau_d^2}{\pi \langle \tau_d \rangle^2}\right) \quad 0 < \tau_d < \infty \tag{2}$$

ISI results in multi-level channel output values due to the effect of the channel's memory on the binary input levels, causing degradation of a receiver's bit error rate (BER) performance. Linear ISI and time-varying PMD effects are generally compensated by using adaptive equalization.

SUMMARY OF THE INVENTION

The present invention relates to non-linear threshold compensation to adjust input sample values from a single mode fiber to mitigate effects of polarization mode dispersion. In accordance with an exemplary embodiment of the present invention, compensation is applied to samples received from an optical channel by generating a decision for a current sample and a previous sample based on a threshold, and generating a decision difference between the decisions for the current and previous samples as an estimate of the direction ("sign/phase") of decision transition. An error signal is generated as a difference between the current sample and the decision for the current sample; and a sample difference is generated between the current and previous samples. A magnitude of correction is combined with the sign/phase to create a correction value, wherein the magnitude of the correction combined with the sign/phase is selected based on the sample difference, the error signal, and the sign/phase; and the correction value is applied to the current sample to apply compensation.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
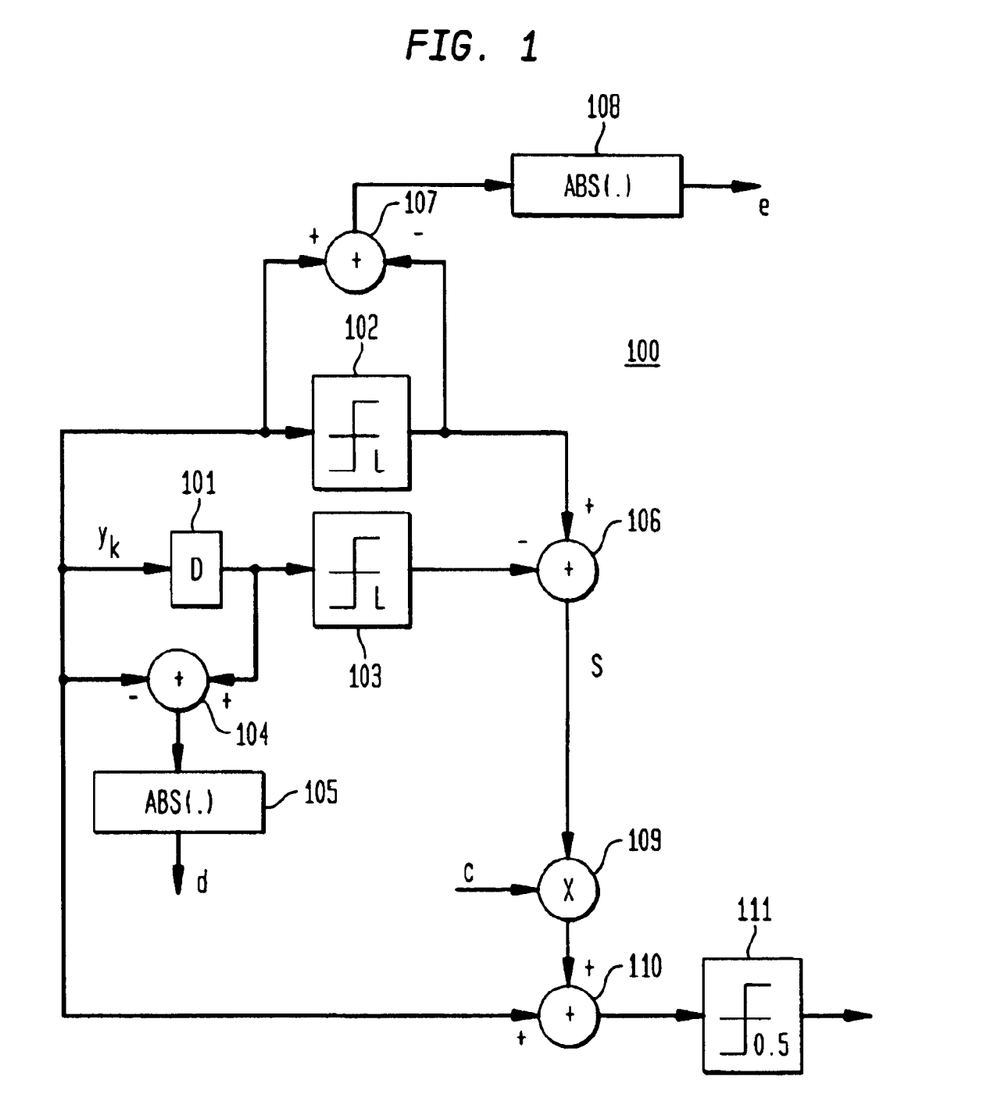
FIG. 1 shows a block diagram of a decision circuit incorporating non-linear threshold compensation (NLC) in accordance with an exemplary embodiment of the present invention.
Figure 2A:
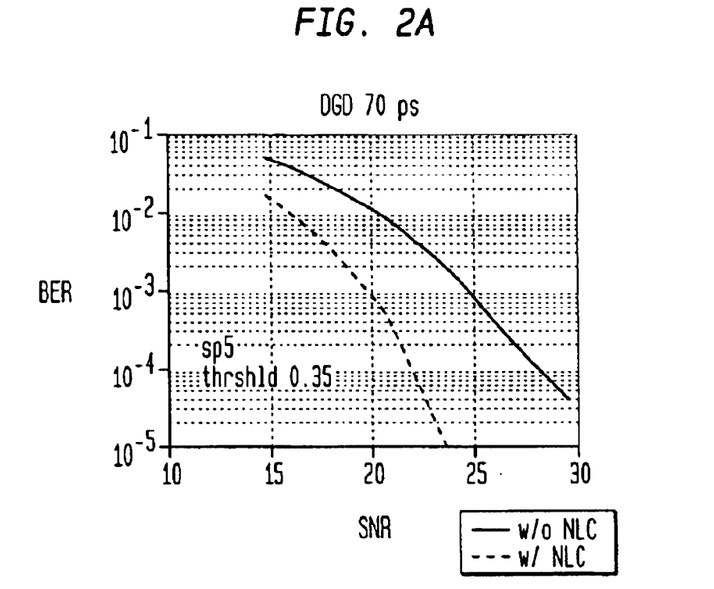
FIG. 2 shows graphs illustrating BER performance of a slicer with and without (NLC) in accordance with exemplary embodiments of the present invention given DGD of 70 ps.
Figure 2B:
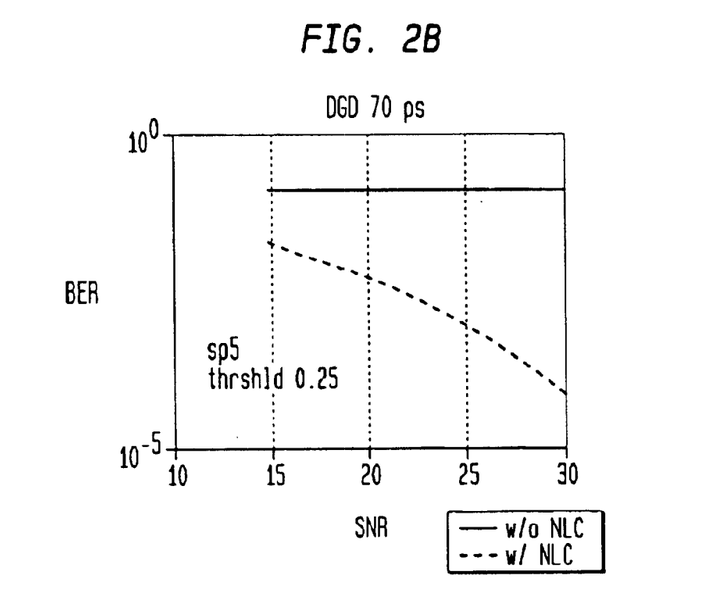
Figure 2C:
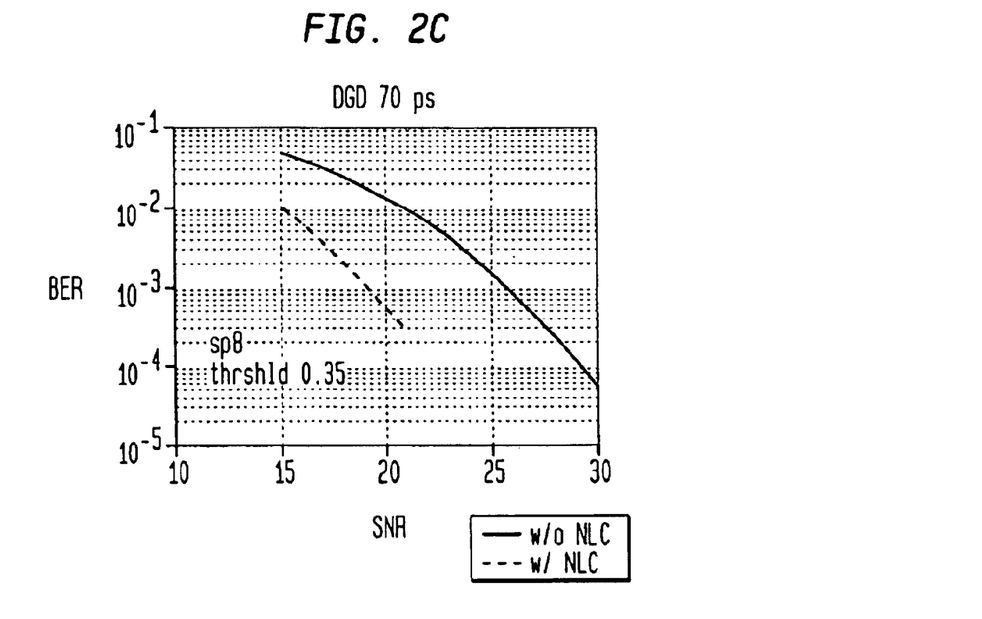
Figure 2D:
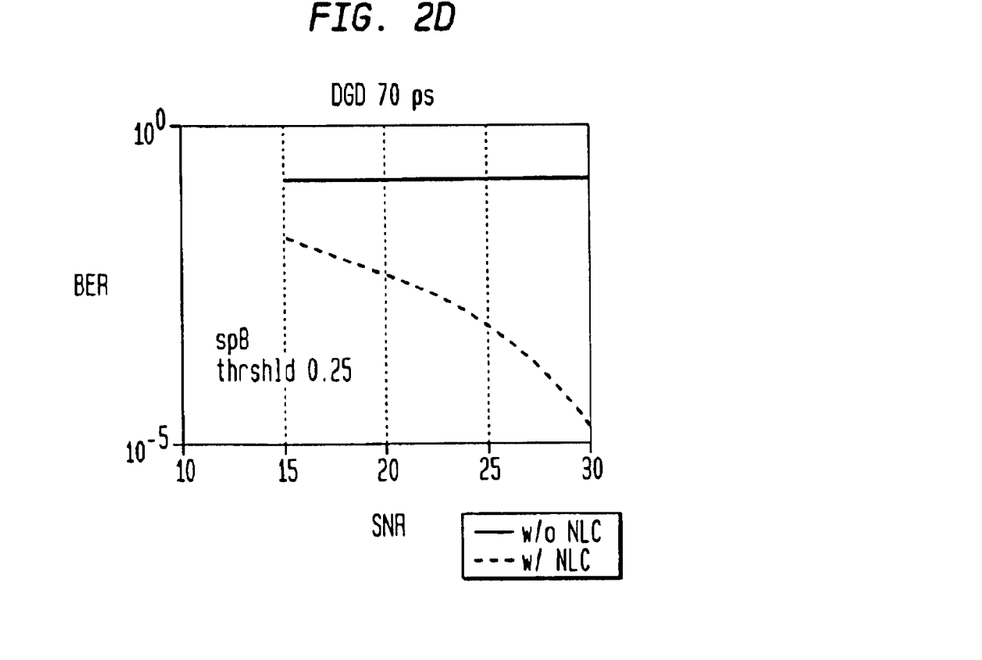
Figure 3A:
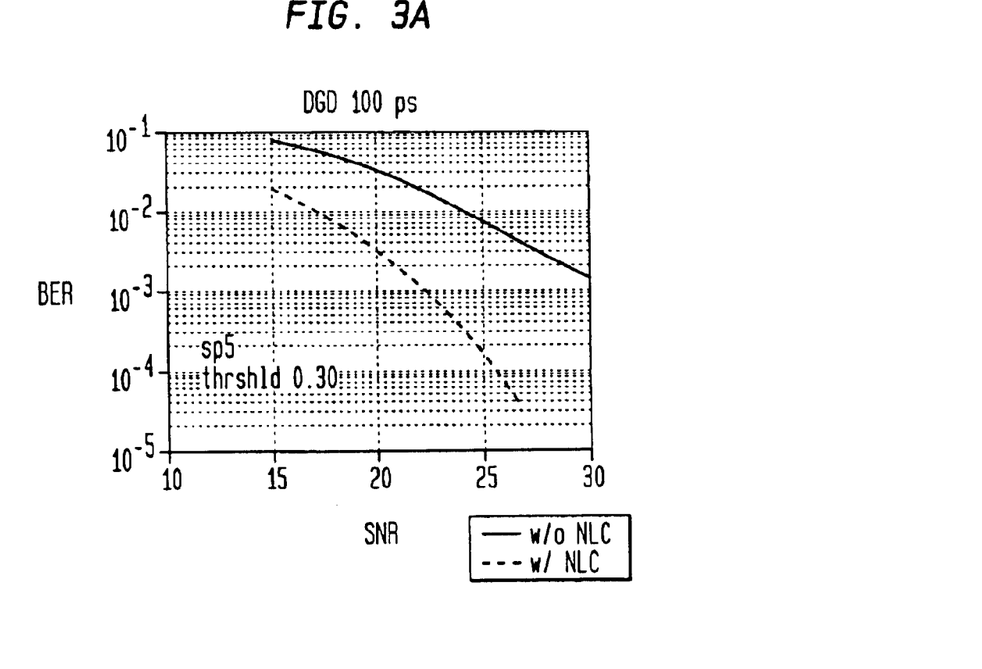
FIG. 3 shows graphs illustrating BER performance of a slicer with and without (NLC) in accordance with exemplary embodiments of the present invention given DGD of 100 ps.
Figure 3B:
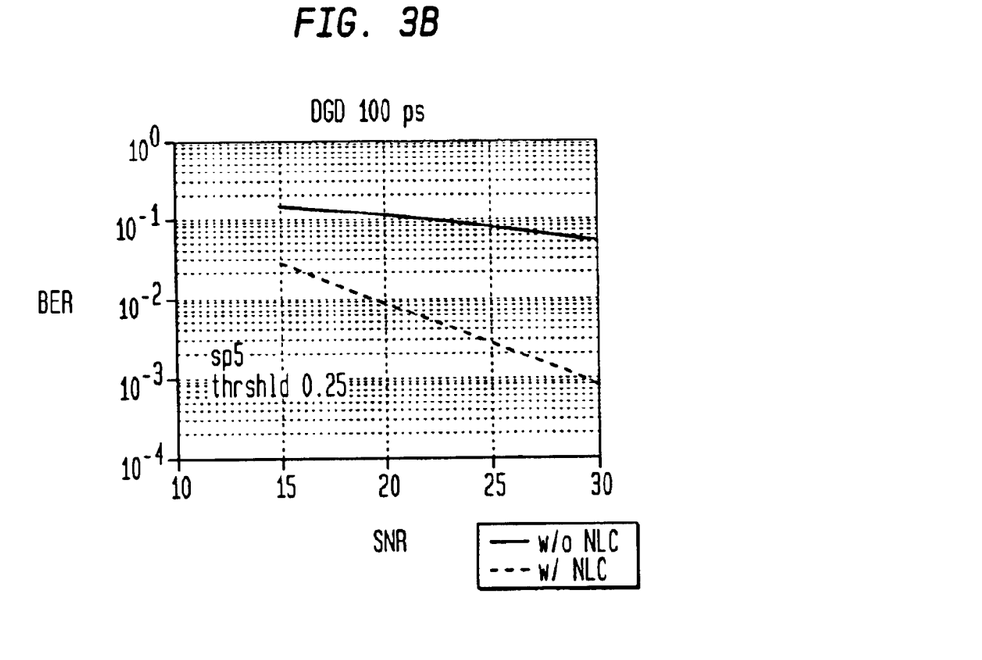
Figure 3C:
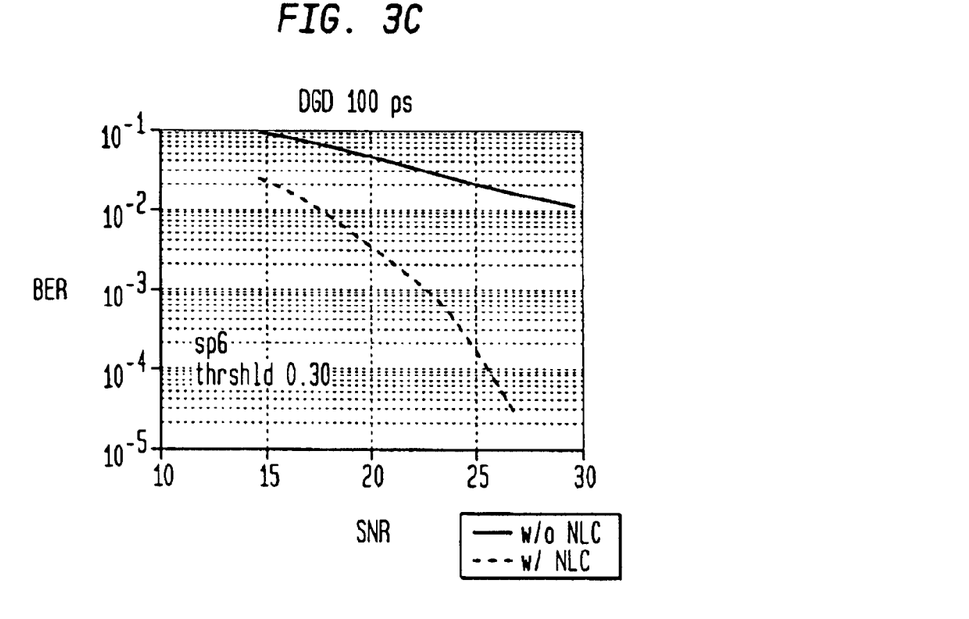
Figure 3D:
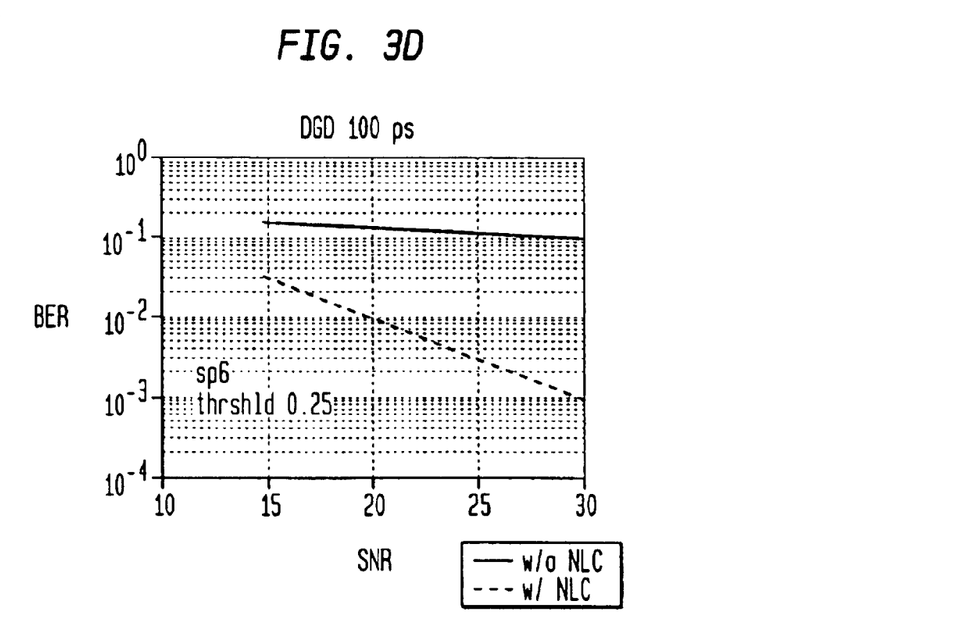
Figure 4A:
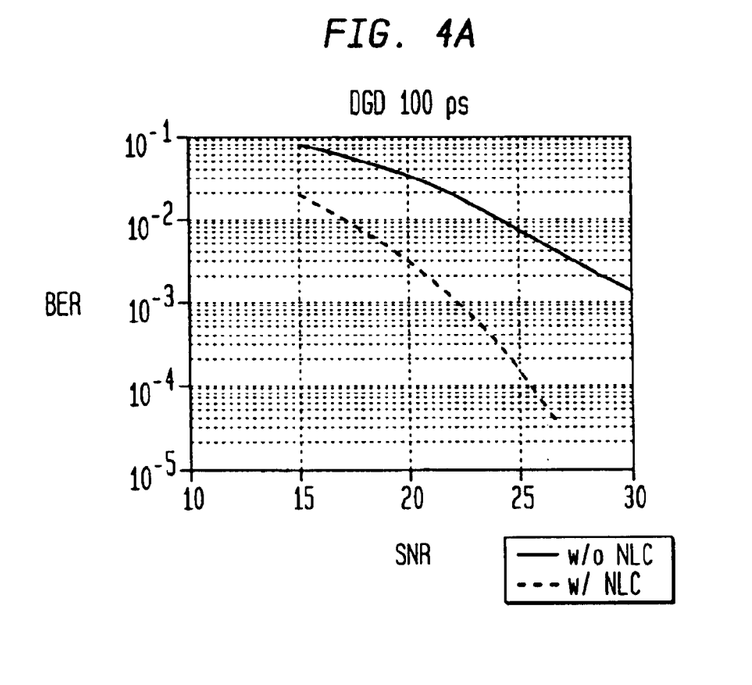
FIG. 4 shows graphs illustrating noise performance of a slicer with and without NLC in accordance with exemplary embodiments of the present invention given DGD of 100 ps.
Figure 4B:
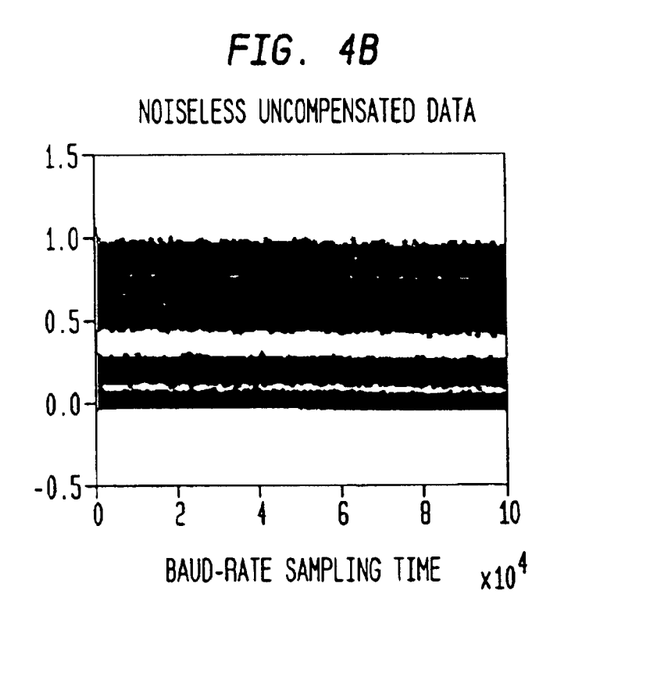
Figure 4C:
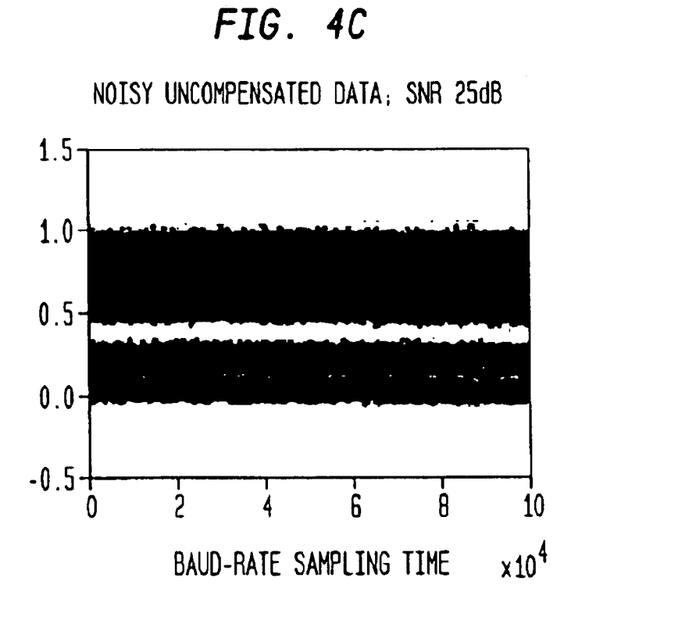
Figure 4D:
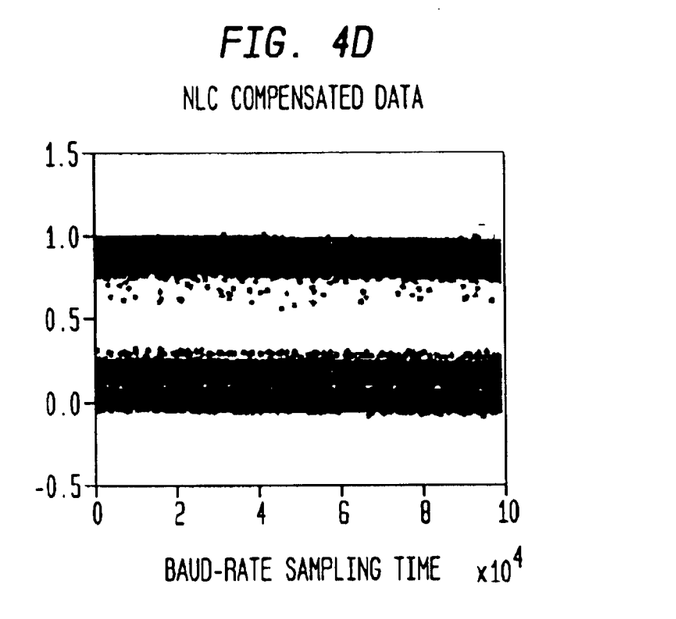
Figure 5A:
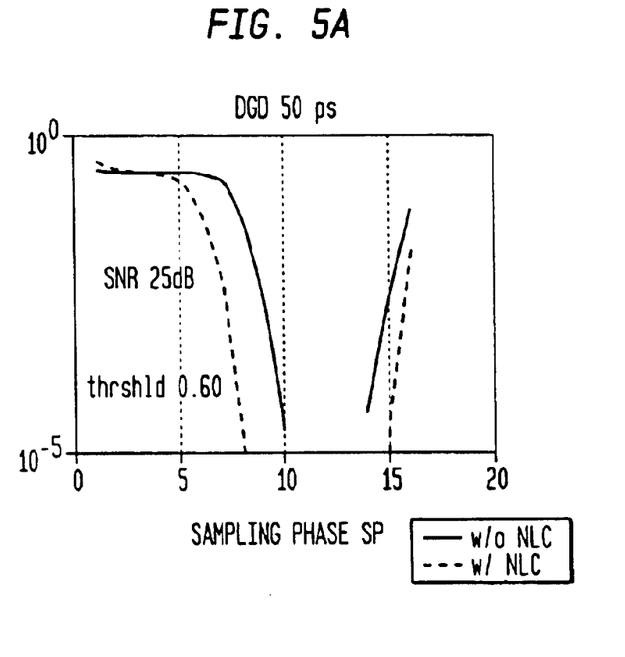
FIG. 5 shows graphs illustrating BER optimization as a function of sampling phase for a slicer with and without NLC in accordance with exemplary embodiments of the present invention.
Figure 5B:
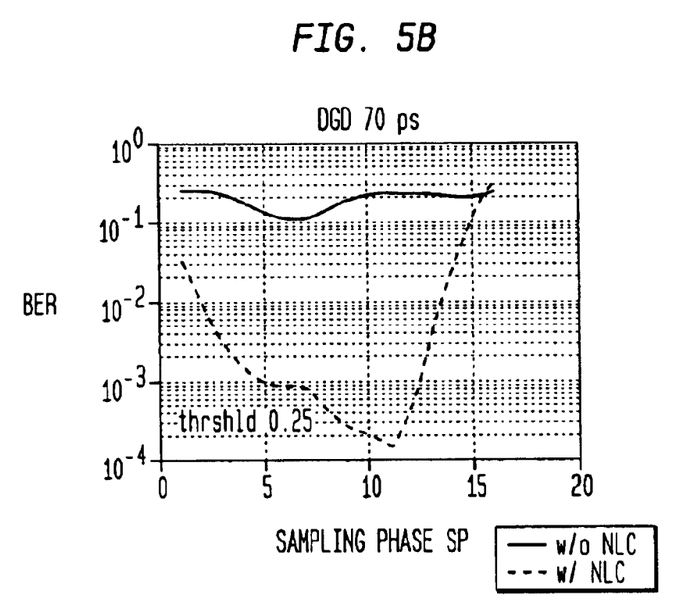
Figure 5C:
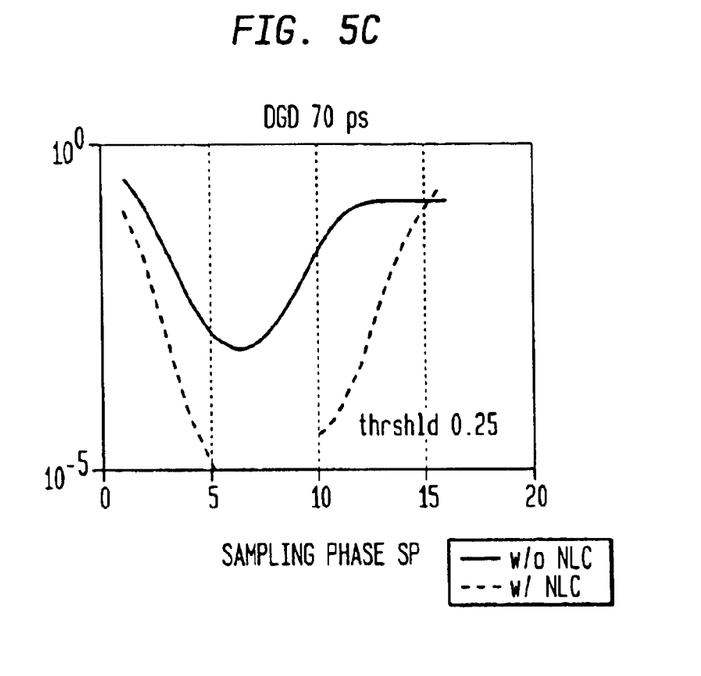
Figure 5D:
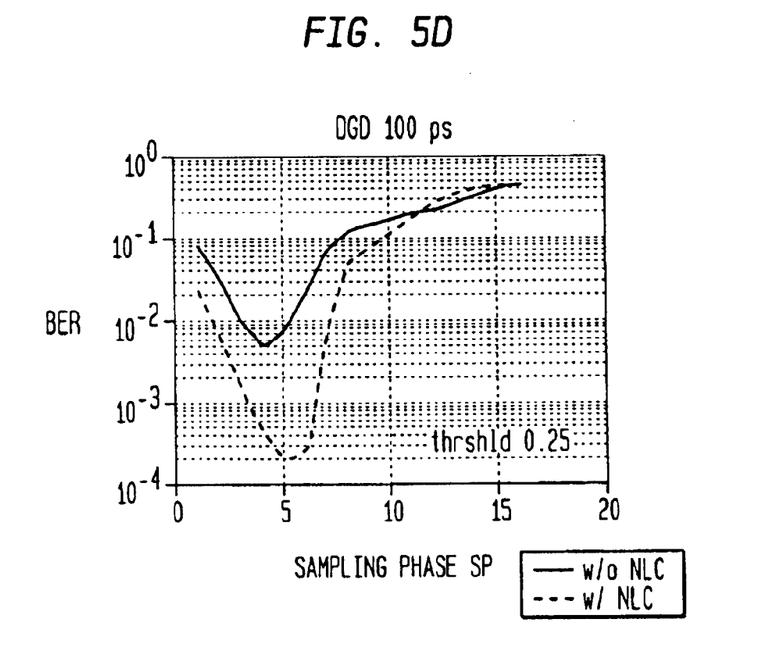

FIG. 1 shows a block diagram of a decision circuit incorporating non-linear threshold compensation (NLC) in accordance with an exemplary embodiment of the present invention. Circuit 100 includes a first data path having slicer 102; combiner 107 and magnitude operator 108 generating error signal e; a second data path having delay 101 and slicer 103; combiner 104 and magnitude operator 105 generating the signal d; a compensation path having combiner 106, multiplier 109, and combiner 110; and a decision device comprising slicer 111.

The exemplary embodiment of FIG. 1 is described with reference to average differential group delay (DGD) of 100 ps and 70 ps for data transmitted through a single mode fiber (SMF) with symbol period $T_S=100$ ps at 10 Gbps (with NRZ line coding) and with a channel model as described in equations (1) and (2). In addition, the present invention is described given that, during acquisition, relatively good sampling phase is achieved (i.e., the sampling clock of the received signal generating input samples is relatively close in phase to the phase of the transmitter clock). However, one skilled in the art may readily extend the teachings herein to other optical transmission channels having different differential group delay and different channel models. In addition, the present invention is described for systems with processing with normalized data and sample values. One skilled in the art would realize that the various equations, variables, and thresholds described herein may be scaled or adjusted by constants as determined for a given application.

Non-linear threshold compensation operates as follows. In the first data path, slicer 102 forms a decision for the input sample $y_k$ at time k based on a threshold L. In the second data path, delay 101 delays the input data samples by one sample, and thus, at time k, slicer 103 forms a decision based on a threshold L for the previous sample $y_{k-1}$. The difference S is generated by combiner 106 as the difference between the values provided from the first and second paths, which is the difference between i) the decision for the current input sample and ii) the decision for the previous input sample. The value of the difference S indicates whether a transition between logic values has occurred in the input data, and represents the direction (sign/phase) of the transition. An optional divider (not shown in FIG. 1) may be used to divide the value of S by 2 to generate a +1, 0, or −1 value corresponding to the direction of transition. This division by 2 may be desirable if slicers 102 and 103 generate values of +1 or −1 for decisions.

In addition to value S, two values are generated to determine the magnitude c of the correction input to multiplier 109. Combiner 107 and magnitude operator 108 generate a magnitude of an error signal e defined as the magnitude of the difference between i) the decision generated by slicer 102 and ii) the input sample $y_k$. Combiner 104 and magnitude operator 105 generate the magnitude d of the difference between i) the current input sample and ii) the previous input sample. The value for the difference d represents a relative "closeness" in value between two consecutive input samples.

The magnitude c of a correction combined in multiplier 109 with the sign/phase represented by S is dependent upon the current state of S, e, and d. The magnitude c of the correction for the exemplary embodiment of FIG. 1 may be as given in equation (3):

$$c = \begin{cases} y_k, & \text{if } S < 0, |e| < 0.3 \\ 1 - y_k, & \text{if } S > 0, |e| < 0.3, |d| > 0.13 \\ 0, & \text{Otherwise} \end{cases} \quad (3)$$

Thresholds for the magnitudes of e and d may be determined experimentally through simulation and observation, such as described subsequently with respect to Table 1.

As shown in equation (3), the decision for which correction to apply is based on detection of the presence or absence of a data transition as indicated by S, closeness in value between two consecutive input samples as indicated by d, and the error between the current sample and the decision for the current sample as indicated by e. When the magnitude c of the correction is combined with S, the result is a correction value that approximates the dispersion effect of the previous data value contained in the current sample. The correction value is then combined with the current sample $y_k$ in combiner 110 to generate a compensated sample. The compensated sample is then applied to slicer 111 that generates a hard decision for the compensated sample at time k. For normalized data, the threshold for slicer 111 is shown as 0.5.

Observation of transmitted data patterns for bit combinations up to three bits through an SMF at 10 Gbps allows for generation of a table of rules for a range (normalized between 0 and 1) of values for the current sample $y_k$ given the previously transmitted data bits. These rules are based on the contributions of previous bit values $d_{k-1}$ and $d_{k-2}$ to the current sample $y_k$ corresponding to the current bit $d_k$. For receiver 100, Table 1 summarizes an exemplary list of rules. In Table 1 "" corresponds to a logic "1" transmitted as a pulse with a given shape, and "−" corresponds to a logic "0" transmitted as a pulse with the inverse of the given shape, and $y_k$ is the input sample corresponding to the last symbol in column 1.

TABLE 1

| Transmitted Data Pattern | Range for $y_k$ with DGD = 100 ps | Range for $y_k$ with DGD = 70 ps |
| --- | --- | --- |
| +− | [0.20, 0.35] | [0.20, 0.35] |
| +−− | ~0.20 | [0.00, 0.10] |
| −−− | [0.00, 0.10] | [0.00, 0.005] |
| −+ | [0.60, 0.75] | [0.55, 0.65] |
| −++ | [0.90, 1.00] | [0.9, 1.00] |
| +++ | [0.95, 1.00] | [0.95, 1.00] |

For Table 1, the worst case PMD data with either 70 ps or 100 ps DGD includes up to a 2-level effect on the current symbol level. Consequently, the threshold levels L of each slicer 102 and 103 in FIG. 1 may be set according to the listed ranges of Table 1. For example, from Table 1 a threshold L for a current decision given the previous sample decision was "+" would be set between the ranges of [0.02, 0.35] and [0.90, 1.00], such as 0.65. As decisions are generated for data, threshold value L may be modified given the decisions for previous samples. In addition, from Table 1 a threshold L for a current decision given the previous sample decision was "−" would be set between the ranges of [0.00, 0.20] and [0.60, 0.75], such as 0.4. Preferred embodiments of the present invention modify L only when a transition between input samples is detected.

FIGS. 2–6 show experimental results comparing the performance of a receiver employing a slicer only to generate decisions for input samples, and a receiver employing non-linear compensation in accordance with embodiments of the present invention. As shown in the figures, employing non-linear threshold compensation in accordance with one or more embodiments of the present invention may improve BER performance, and related SNR performance, of a receiver.

FIG. 2 shows graphs illustrating bit error rate (BER) performance of a slicer with (dashed line) and without (solid line) non-linear threshold compensation (NLC) in accordance with exemplary embodiments of the present invention given DGD of 70 ps. As shown in FIGS. 2A–2D, the gain of the slicer with NLC is up to 2 orders of magnitude lower SNR. FIG. 2A is a graph of BER versus signal-to-noise ratio (SNR) for a sampling phase of 5 (SP=5) and threshold L of 0.35. FIG. 2B is a graph of BER versus SNR for a sampling phase of SP=5 and threshold L of 0.25. FIG. 2C is a graph of BER versus SNR for a sampling phase of 8 (SP=8) and threshold L of 0.35. FIG. 2D is a graph of BER versus SNR for a sampling phase of SP=8 and threshold L of 0.25.

FIG. 3 shows graphs illustrating BEIR performance of a slicer with (dashed line) and without (solid line) NLC in accordance with exemplary embodiments of the present invention given DGD of 100 ps. As shown in FIGS. 3A–3D, the gain of the slicer with NLC is up to 2 orders of magnitude lower SNR. FIG. 3A is a graph of BER versus SNR for a sampling phase of 5 (SP=5) and threshold L of 0.3. FIG. 3B is a graph of BER versus SNR for a sampling phase of SP=5 and threshold L of 0.25. FIG. 3C is a graph of BER versus SNR for a sampling phase of 8 (SP=8) and threshold L of 0.3. FIG. 3D is a graph of BER versus SNR for a sampling phase of SP=8 and threshold L of 0.25.

FIG. 4 shows graphs illustrating noise performance of a slicer with (dashed line) and without (solid line) NLC in accordance with exemplary embodiments of the present invention given DGD of 100 ps. FIG. 4A is a graph of BER versus SNR for a simulation with a sampling phase of 5 (SP=5) and threshold L of 0.3, and FIG. 4B is a graph of data value amplitudes versus sp (baud-rate sampling time) without added noise and without compensation. FIG. 4C is a graph of data value amplitudes versus sp (baud-rate sampling time) with added (white Gaussian) noise but without compensation, while FIG. 4DC is a graph of data value amplitudes versus sp (baud-rate sampling time) with added (white Gaussian) noise and with NLC. Comparing FIGS. 4C and 4D illustrates improvement in noise margin when a slicer employs NLC in accordance with an exemplary embodiment of the present invention.

FIG. 5 shows graphs illustrating BER optimization as a function of sampling phase for a slicer with (dashed line) and without (solid line) NLC in accordance with exemplary embodiments of the present invention. FIG. 5A shows BER optimization as a function of sampling phase for an SNR of 25 dB and threshold of 0.6 for DGD of 50 ps. FIG. 5B shows BER optimization as a function of sampling phase for SNR of 25 dB and a threshold of 0.25 for DGD of 70 ps. FIG. 5C shows BER optimization as a function of sampling phase for SNR of 25 dB and a threshold of 0.35 for DGD of 70 ps. FIG. 5D shows BER optimization as a function of sampling phase for SNR of 25 dB and a threshold of 0.3 for DGD of 100 ps.

Figure 6A:
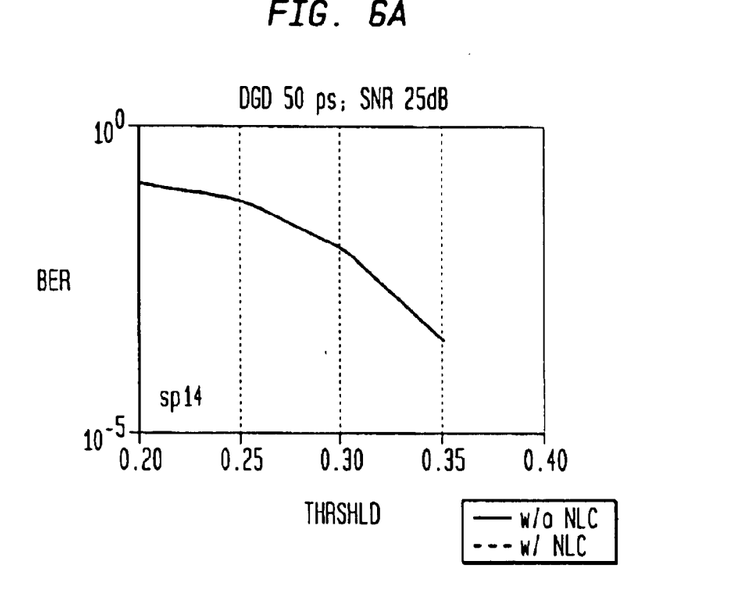
FIG. 6 shows graphs illustrating BER optimization as a function of threshold for a slicer with and without NLC in accordance with exemplary embodiments of the present invention.
Figure 6B:
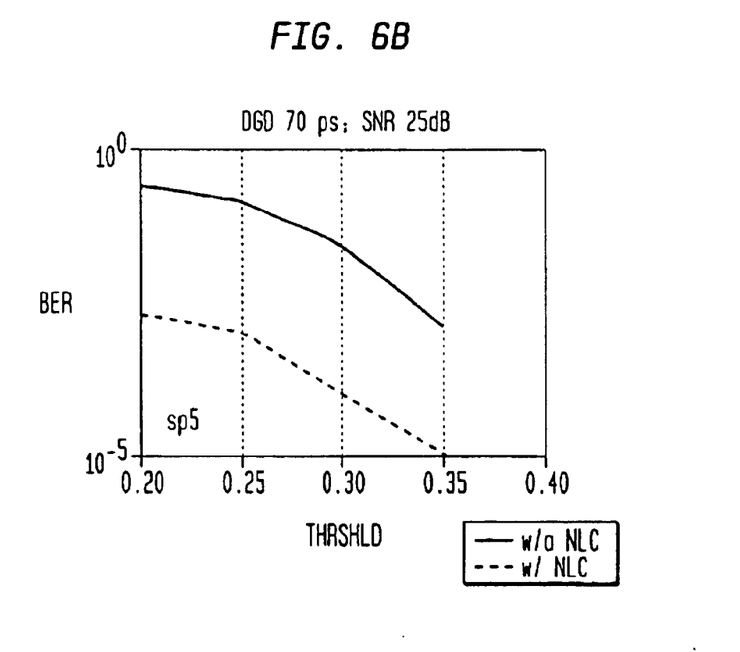
Figure 6C:
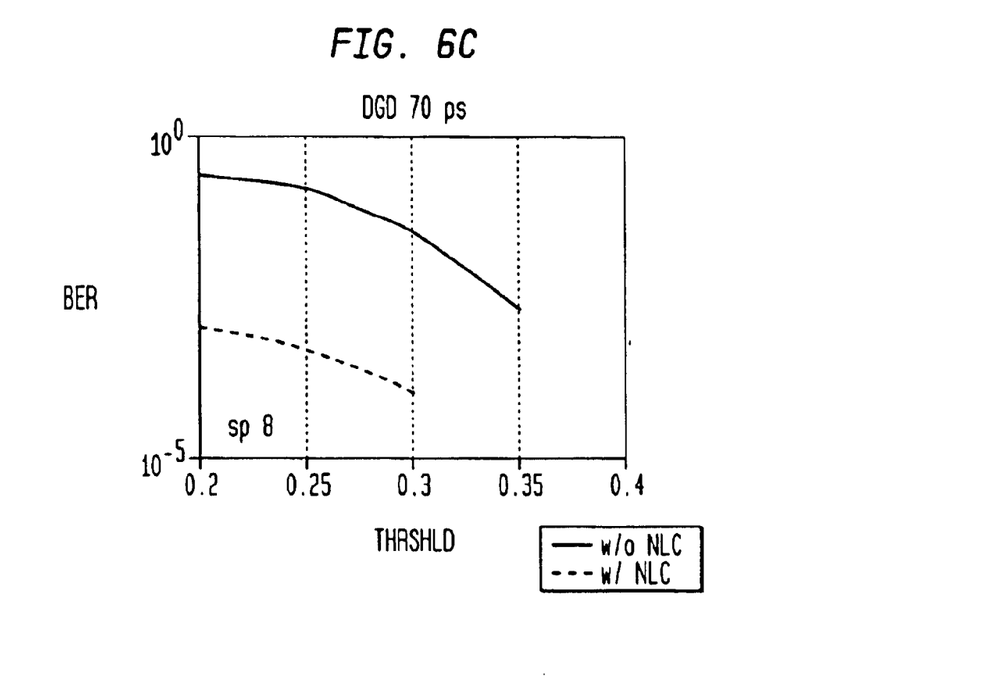
Figure 6D:
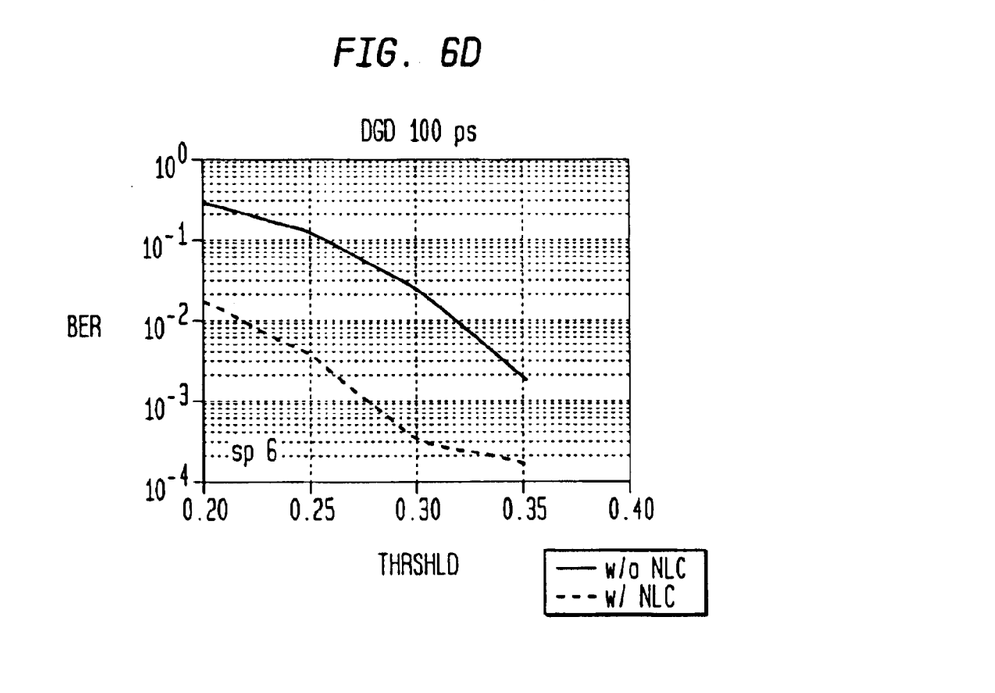

FIG. 6 shows graphs illustrating BER optimization as a function of threshold for a slicer with (dashed line) and without (solid line) NLC in accordance with exemplary embodiments of the present invention for sampling phases of 14 (FIG. 6A), 5 (FIG. 6B), 8 (FIG. 6C), and 6 (FIG. 6D).

Figure 7:
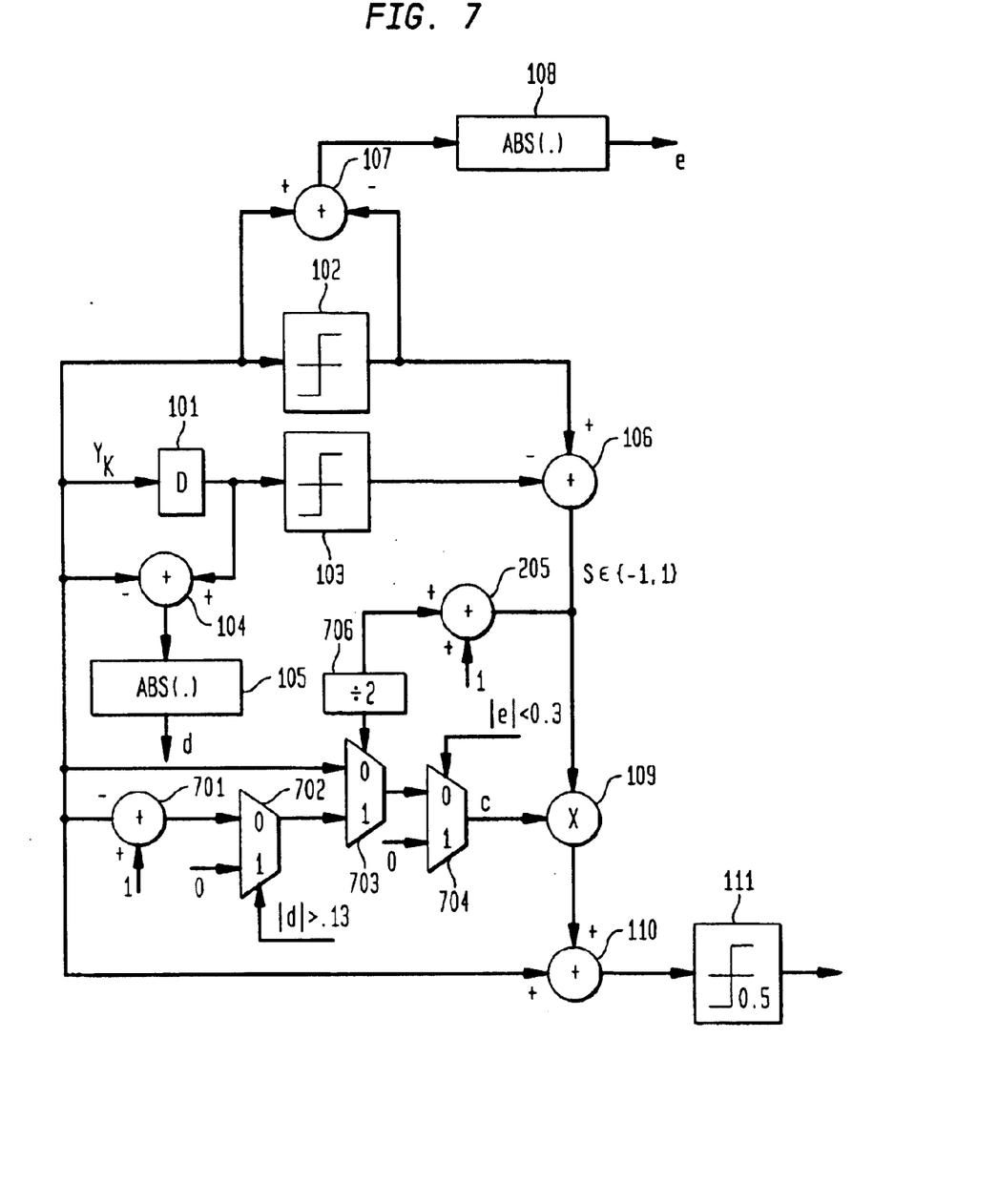
FIG. 7 shows the circuit of FIG. 1 incorporating logic for selecting the magnitude of correction for fixed threshold level.
Figure 8:
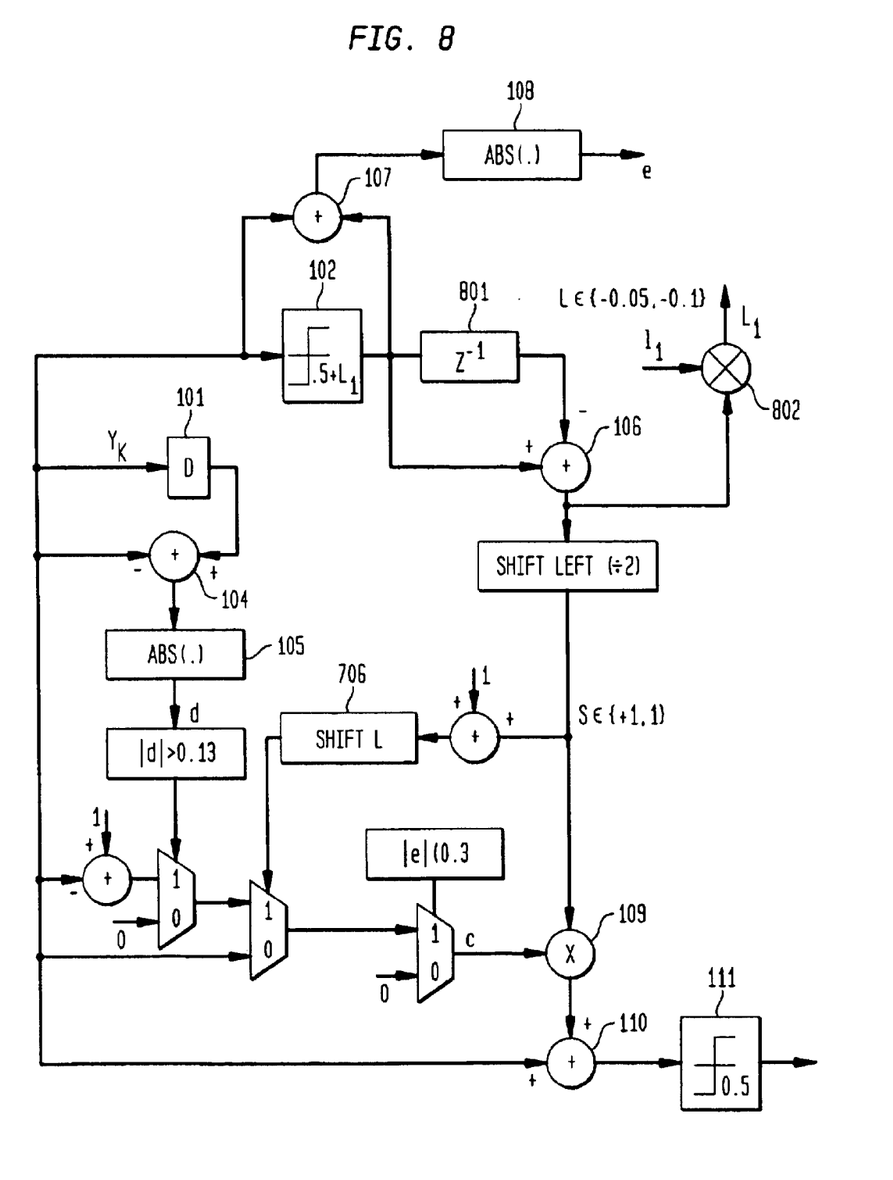
FIG. 8 shows the circuit of FIG. 1 incorporating logic for selecting the magnitude of correction for adaptive threshold level for first-order symbol transitions.
Figure 9:
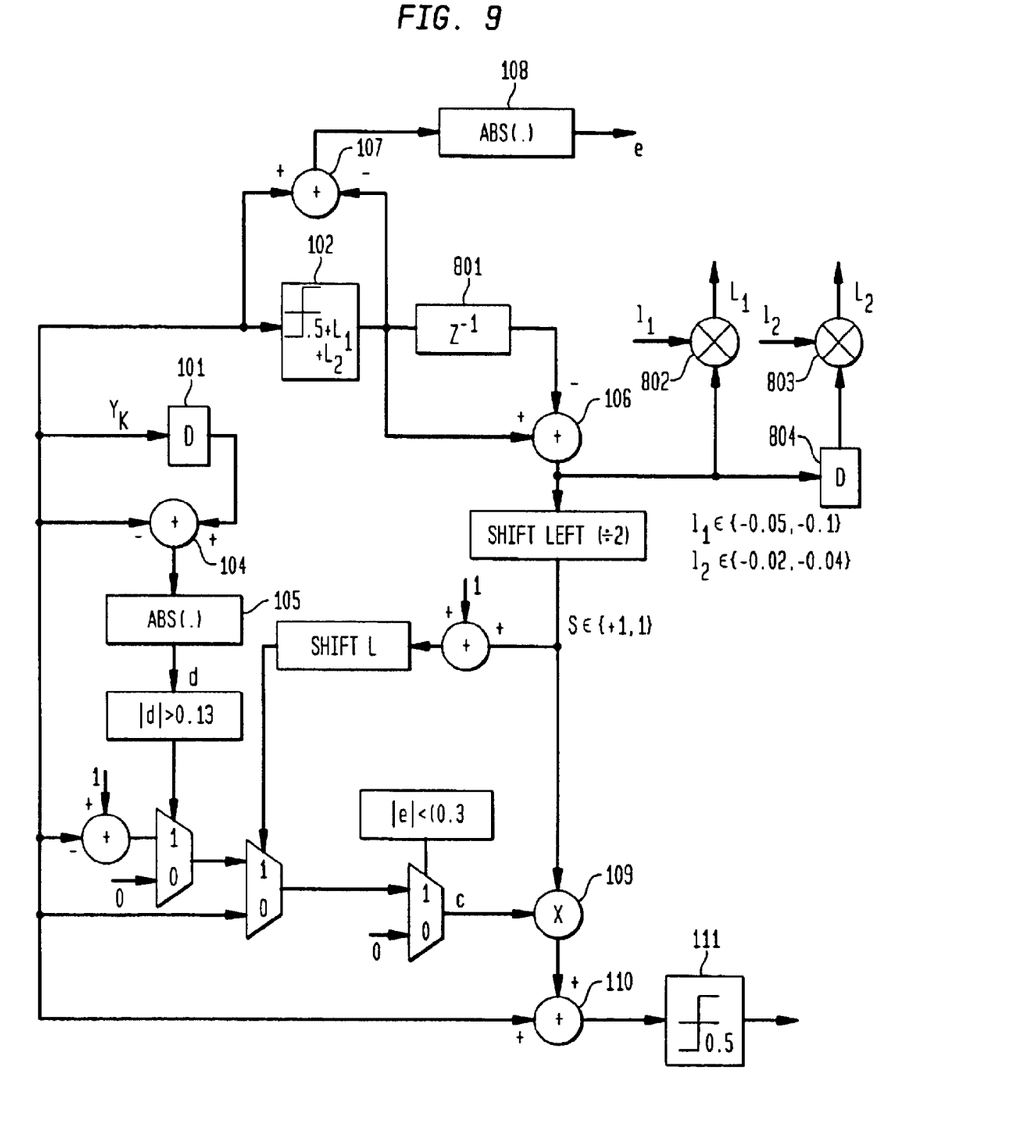
FIG. 9 shows the circuit of FIG. 1 incorporating logic for selecting the magnitude of correction for adaptive threshold level for first- and second-order symbol transitions.

FIG. 7 shows the circuit of FIG. 1 incorporating logic for selecting the magnitude of correction for fixed threshold level. As shown in FIG. 7, multiplexers (muxes) 702, 703, and 704, and adder 701 implement the tests of equation (3) above. Adder 705 and divider 706 are employed to generate logic 1 or 0 from S for mux 703. FIG. 8 shows the circuit of FIG. 1 incorporating logic for selecting the magnitude of correction for adaptive threshold level for first-order symbol transitions. The circuit of FIG. 8 is similar to that of FIG. 7 for fixed threshold, except that only one slicer, slicer 102, is used with delay 801 to generate current and previous sample decisions. Slicer 102 employs a threshold $(0.5+L_1)$, where $L_1$ is adaptively set based on the combination of 1) the difference between the current and previous output decisions of slicer 102, and 2) a constant $l_1$ determined from the particular transition from, for example, Table 1. Since only one symbol transition is used, the circuit of FIG. 8 adapts the threshold for first-order symbol transitions (i.e., a current transition from the previous to the current sample including effects of the previous sample). FIG. 9 shows the circuit of FIG. 1 incorporating logic for selecting the magnitude of correction for adaptive threshold level for first- and second-order symbol transitions (i.e., a second order transition is the current transition including effects of both prior symbols). The circuit of FIG. 9 differs from the circuit of FIG. 8 by slicer 102 having its threshold of $(0.5+L_1+L_2)$, where $L_2$ is adaptively set based on 1) the previous difference between output decisions of slicer 102, and 2) constant $l_2$ determined from the particular transition from, for example, Table 1.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for applying compensation to samples received from an optical channel comprising
    a first decision device generating a decision for a current sample based on a threshold;
    a second decision device generating a decision for a previous sample based on the threshold;
    a first combiner generating a direction of transition between the decisions for the current and previous samples from a decision difference;
    a second combiner generating an error signal as a difference between the current sample and the decision for the current sample;
    a third combiner generating a sample difference between the current and previous samples;
    a multiplier combining a magnitude of correction with the direction of transition to generate a correction value, wherein the multiplier selects the magnitude of correction based on the sample difference, the error signal, and the decision difference; and
    a fourth combiner applying the correction value to the current sample to apply compensation to the current sample.

2. The invention as recited in claim 1, further comprising a third decision device generating a hard decision for the current sample based on the compensated current sample.

3. The invention as recited in claim 1, wherein the threshold is set based on a set of rules, wherein each rule is based on an observation of sample level given one or more observed previous samples.

4. The invention as recited in claim 3, wherein, for each decision device, the threshold is set for each sample.

5. The invention as recited in claim 1, wherein the magnitude c of correction for the $k^{th}$ sample $y_k$ is given by:

$$c = \begin{cases} y_k, & \text{if } S < 0, |e| < T_1 \\ 1 - y_k, & \text{if } S > 0, |e| < T_1, |d| > T_2 \\ 0, & \text{Otherwise} \end{cases}$$

where S is the decision difference, e is the error signal, d is the sample difference, and $T_1$ and $T_2$ are constants based on a specific implementation.

6. The invention as recited in claim 1, wherein the compensation applied to the current sample accounts for differential group delay of a signal passing through a single mode fiber.

7. The invention as recited in claim 1, wherein the apparatus is embodied in an integrated circuit.

8. The invention as recited in claim 1, wherein the apparatus is implemented in a receiver of an optical communication terminal.

9. A method of applying compensation to samples received from an optical channel comprising the steps of:
    (a) generating a decision for a current sample and a decision for a previous sample based on a threshold;
    (b) generating a direction of transition between the decisions for the current and previous samples based on a decision difference;
    (c) generating an error signal as a difference between the current sample and the decision for the current sample;
    (d) generating a sample difference between the current and previous samples;
    (e) selecting a magnitude of correction combined with the direction of transition based on the sample difference, the error signal, and the decision difference;
    (f) forming a correction value from the magnitude of correction with the direction of transition; and
    (g) combining the correction value with the current sample to apply compensation.

10. The invention as recited in claim 9, further comprising the step of generating a hard decision for the current sample based on the compensated current sample.

11. The invention as recited in claim 9, further comprising the step of setting the threshold based on a set of rules, wherein each rule is based on an observation of sample level given one or more observed previous samples.

12. The invention as recited in claim 11, wherein the threshold is set for each sample.

13. The invention as recited in claim 9, wherein, for step (f) the magnitude c of correction for the $k^{th}$ sample $y_k$ is given by:

$$c = \begin{cases} y_k, & \text{if } S < 0, |e| < T_1 \\ 1 - y_k, & \text{if } S > 0, |e| < T_1, |d| > T_2 \\ 0, & \text{Otherwise} \end{cases}$$

where S is the decision difference, e is the error signal, d is the sample difference, and $T_1$ and $T_2$ are constants based on a specific implementation.

14. The invention as recited in claim 9, wherein for step (g), the compensation applied to the current sample accounts for differential group delay of a signal passing through a single mode fiber.

15. The invention as recited in claim 9, wherein the method is embodied in a processor of an integrated circuit.

16. The invention as recited in claim 9, wherein the method is embodied in a receiver of an optical communication terminal.

17. A computer-readable medium having stored thereon a plurality of instructions, the plurality of instructions including instructions which, when executed by a processor, cause the processor to implement a method for applying compensation to samples received from an optical channel, the method comprising the steps of:
    (a) generating a decision for a current sample and a decision for a previous sample based on a threshold;
    (b) generating a direction of transition between the decisions for the current and previous samples based on a decision difference;

(c) generating an error signal as a difference between the current sample and the decision for the current sample;

(d) generating a sample difference between the current and previous samples;

(e) selecting a magnitude of correction combined with the direction of transition based on the sample difference, the error signal, and the decision difference;

(f) forming a correction value from the magnitude of correction with the direction of transition; and (g) combining the correction value with the current sample to apply compensation.

* * * * *